United States Patent Office.

JOSÉ MARIA BLANCO Y NUÑO, OF HAVANA, CUBA.

Letters Patent No. 82,588, dated September 29, 1868.

IMPROVEMENT IN PRESERVING FRUIT AND VEGETABLES.

The Schedule referred to in these Letters Patent and making part of the same.

TO ALL WHOM IT MAY CONCERN:

Be it known that I, JOSÉ MARIA BLANCO Y NUÑO, of Havana, in the Island of Cuba, have invented certain new and useful Improvements in Preserving Fruits, &c., from decay; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in preparing a paste composed of plaster of Paris, mixed with salt and water dissolved, and then encasing the fruit or vegetables to be preserved, each one separately, with a thick coating of this paste, which soon sets or dries, and thereby encases the article in an air-tight case or shell, by which it can be preserved for an indefinite length of time.

It is obvious that a paste composed of plaster or clay, mixed with water and any suitable gum or resin, may be used in the same manner, but I prefer the use of the plaster and salt water, as the salt has also a preservative effect chemically, and this acting with the plaster to form a shell, which operates mechanically to exclude the air, I find to operate in a very superior manner.

What I claim, is—

The process of preserving fruits and vegetables, substantially as herein described.

JOSÉ MARIA BLANCO Y NUÑO.

Witnesses:
J. M. KENNEDY,
P. T. DODGE.